US010296462B2

(12) United States Patent
Loaiza et al.

(10) Patent No.: US 10,296,462 B2
(45) Date of Patent: May 21, 2019

(54) METHOD TO ACCELERATE QUERIES USING DYNAMICALLY GENERATED ALTERNATE DATA FORMATS IN FLASH CACHE

(71) Applicant: Oracle International Corporation, Redwood Shores, CA (US)

(72) Inventors: Juan Loaiza, Woodwide, CA (US); Amit Ganesh, San Jose, CA (US); Roger Macnicol, Hummelstown, PA (US); Jesse Kamp, Castro Valley, CA (US); Allison Holloway, San Carlos, CA (US); Adrian Ng, Mountain View, CA (US); Vineet Marwah, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/840,811

(22) Filed: Mar. 15, 2013

(65) Prior Publication Data

US 2014/0281247 A1     Sep. 18, 2014

(51) Int. Cl.
*G06F 12/08*     (2016.01)
*G06F 12/0875*     (2016.01)
(Continued)

(52) U.S. Cl.
CPC .......... *G06F 12/0875* (2013.01); *G06F 16/22* (2019.01); *G06F 16/24552* (2019.01)

(58) Field of Classification Search
CPC .......... G06F 12/0875; G06F 17/30312; G06F 17/3048
See application file for complete search history.

(56) References Cited

U.S. PATENT DOCUMENTS 5,255,356 A    10/1993   Michelman et al.
5,265,246 A    11/1993   Li
(Continued)

FOREIGN PATENT DOCUMENTS

WO     WO2012/032184 A1     3/2012

OTHER PUBLICATIONS

W3Schools NPL "SQL Update Statement" Archive Documentation captured by Wayback Machine on Apr. 19, 2012. Also available at <http://www.w3schools.com/sql/sql_update.asp>.*

(Continued)

*Primary Examiner* — Hashem Farrokh
*Assistant Examiner* — Jane Wei
(74) *Attorney, Agent, or Firm* — Hickman Palermo Becker Bingham LLP; Malgorzata A. Kulczycka (57) ABSTRACT

A method for accelerating queries using dynamically generated columnar data in a flash cache is provided. In an embodiment, a method comprises a storage device receiving a first request for data that is stored in the storage device in a base major format in one or more primary storage devices. The storage device comprises a cache. The base major format is any one of: a row-major format, a column-major format and a hybrid-columnar format. Based on first one or more criteria, it is determined whether to rewrite the data into rewritten data in a rewritten major format. In response to determining to rewrite the data into rewritten data in a rewritten major format, the storage device rewrites at least a portion of the data into particular rewritten data in the rewritten major format. The rewritten data is stored in the cache.

27 Claims, 5 Drawing Sheets

(51) Int. Cl.
*G06F 16/22* (2019.01)
*G06F 16/2455* (2019.01)

(56) References Cited

U.S. PATENT DOCUMENTS

| | | | |
|---|---|---|---|
| 5,404,510 A | 4/1995 | Smith et al. | |
| 5,943,689 A | 8/1999 | Tamer | |
| 7,031,994 B2 | 4/2006 | Lao et al. | |
| 7,272,589 B1 | 9/2007 | Guay | |
| 7,496,589 B1 | 2/2009 | Jain et al. | |
| 8,032,499 B2 | 10/2011 | Faerber et al. | |
| 8,203,972 B2 | 6/2012 | Sauermann | |
| 8,392,382 B2 | 3/2013 | Marwah et al. | |
| 8,583,692 B2 | 11/2013 | Ganesh et al. | |
| 8,645,337 B2 | 2/2014 | Kapoor et al. | |
| 8,832,142 B2 | 9/2014 | Marwah et al. | |
| 9,292,564 B2 | 3/2016 | Kamp et al. | |
| 9,703,706 B2 | 7/2017 | Bagal et al. | |
| 9,952,782 B1 | 4/2018 | Chandrasekaran | |
| 2002/0059287 A1 | 5/2002 | Karasudani | |
| 2004/0033803 A1 | 2/2004 | Varonen et al. | |
| 2004/0117396 A1 | 6/2004 | Avadhanam et al. | |
| 2005/0086267 A1 | 4/2005 | Avadhanam et al. | |
| 2007/0078914 A1 | 4/2007 | Correl | |
| 2008/0222136 A1 | 9/2008 | Yates | |
| 2008/0235479 A1 | 9/2008 | Scales | |
| 2008/0281784 A1 | 11/2008 | Zane et al. | |
| 2008/0294676 A1 | 11/2008 | Faerber et al. | |
| 2009/0254521 A1 | 10/2009 | Raman | |
| 2010/0070448 A1 | 3/2010 | Omoigui | |
| 2010/0122026 A1 | 5/2010 | Umamageswaran | |
| 2010/0161567 A1 | 6/2010 | Makela | |
| 2011/0016157 A1* | 1/2011 | Bear et al. | 707/804 |
| 2011/0029569 A1 | 2/2011 | Ganesh et al. | |
| 2011/0066791 A1* | 3/2011 | Goyal | G06F 12/0866 711/103 |
| 2011/0137940 A1* | 6/2011 | Gradin et al. | 707/769 |
| 2011/0191522 A1 | 8/2011 | Condict | |
| 2012/0117038 A1 | 5/2012 | Ganesh et al. | |
| 2012/0166729 A1 | 6/2012 | Donley | |
| 2012/0173515 A1* | 7/2012 | Jeong | G06F 17/30569 707/718 |
| 2012/0173774 A1 | 7/2012 | Lee | |
| 2012/0290786 A1 | 11/2012 | Mesnier | |
| 2012/0296883 A1* | 11/2012 | Ganesh | G06F 17/30315 707/693 |
| 2013/0290598 A1 | 10/2013 | Fiske | |
| 2015/0019834 A1 | 1/2015 | Loh | |
| 2015/0088830 A1 | 3/2015 | Kamp et al. | |
| 2015/0089138 A1 | 3/2015 | Tao et al. | |
| 2015/0100556 A1 | 4/2015 | Sekiguchi | |
| 2015/0149479 A1 | 5/2015 | Geringer et al. | |
| 2016/0026579 A1 | 1/2016 | Samanta | |
| 2016/0188414 A1 | 6/2016 | Jayakumar | |
| 2017/0060918 A1 | 3/2017 | Iyer | |
| 2017/0166136 A1 | 4/2017 | Manicol | |
| 2017/0177488 A1 | 6/2017 | Leung | |
| 2017/0206199 A1 | 7/2017 | Umamageswaran | |

OTHER PUBLICATIONS

Dittrich et al., "Towards a One Size Fits All Database Architecture" Proceedings of the 5th Biennial Conference on Innovative Data Systems Research, dated Jan. 6, 2011, 4 pages.
Schaffner et al., "A Hybrid Row-Column OLTP Database Architecture for Operational Reporting", dated Aug. 24, 2008, 14 pages.
Microsoft, "Database Instant File Initialization", SQL Server 2016, https://msdn.microsoft.com/en-us/library/ms175935.aspx, 3 pages.
Ailamaki, Anastassia, et al, "Weaving Relations for Cache Performance," Proceedings of the 27th International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright © 2000, ISBN-0/ 8053-1755-4, pp. 32, 70, 118, 131-132, 134, 155-159, 170, 252-254, 558, 569-573, 591-592, and 789-790 (26 pgs).
Kapoor, U.S. Appl. No. 14/079,507, filed Nov. 13, 2013, Final Office Action, dated Jul. 27, 2017.
Muhkherjee et al., U.S. Appl. No. 15/257,754, filed Sep. 6, 2016, Office Action, dated Nov. 16, 2017.
Umamageswaran, U.S. Appl. No. 15/410,496, filed Jan. 19, 2017, Office Action, dated Oct. 23, 2018.
Muhkherjee, U.S. Appl. No. 15/257,754, filed Sep. 6, 2016, Corrected Notice of Allowance, dated Aug. 28, 2018.
Umamageswarn, U.S. Appl. No. 15/410,496, filed Jan. 19, 2017, Interview Summary, dated Jan. 23, 2019.
Kapoor, U.S. Appl. No. 14/079,5047, filed Nov. 13, 2013, Final Office Action, dated Jan. 10, 2019.

* cited by examiner

METHOD TO ACCELERATE QUERIES USING DYNAMICALLY GENERATED ALTERNATE DATA FORMATS IN FLASH CACHE

CROSS-REFERENCE TO RELATED APPLICATIONS

This application is related to: (1) U.S. patent application Ser. No. 12/769,508, filed Apr. 28, 2010 by Vineet Marwah, et al., titled Compression Analyzer, (2) U.S. patent application Ser. No. 12/769,205, filed Apr. 28, 2010 by Vikram Kapoor, et al., titled Storing Compression Units In Relational Tables, (3) U.S. patent application Ser. No. 12/617,669, filed Nov. 12, 2009, by Amit Ganesh, et al., titled Structure of Hierarchical Compressed Data Structure for Tabular Data, and (4) U.S. Provisional Patent Application No. 61/174,447, filed Apr. 30, 2009. The content of all the patent applications mentioned in this paragraph are incorporated herein by reference. The applicants hereby rescind any disclaimer of claim scope in the parent application(s) or the prosecution history thereof and advise the USPTO that the claims in this application may be broader than any claim in the parent application(s).

FIELD OF THE INVENTION

The present invention relates to data storage systems and more particularly to accelerating queries using dynamically generated rewritten data stored in flash cache.

BACKGROUND

Traditionally, data has been stored in either row-major format or column-major format. However, neither storage format seems to be optimal for meeting a variety of data access requirements. For example, some operations may be performed faster on the row-major data than on the column-major data, while other operations may be performed faster on the pure columnar data than on the row-major data. This is often due to the fact that some data access operations place demands on CPU resources, while other place demands on I/O operations. Hence, maintaining a balance between a CPU load and a disk load may be challenging in determining a data format for storing the data.

One solution includes creating two copies of the data on a disk: one copy for each format. This approach is often referred to as a fractured-mirror approach. However, although the fractured-mirror approach seems to solve the data access dilemma for a query processing, the approach may be expensive to implement. For example, the cost of doubling disk capacity and replicating the data may be high. Also, the time to load the data onto the disk may be significantly long.

Another solution to the data storage problem may include creating columnar indexes on the most commonly used columns of the data, and relying on the indexes to speed up access to the data access. However, that approach may also be costly and time-consuming.

Other solutions may be based on a Hybrid Columnar Compression (HCC) approach. In HCC, the data in a set of blocks are pivoted into column-major format. The column runs may be limited to a default length, locally specified for the blocks. This approach allows both efficient row-major access, by accessing a few contiguous blocks, and efficient table-scan access, by immediate navigation to the required columns and fast columnar processing of operations on those columns.

Yet other solution focus on reducing a CPU cost of processing common expressions. This may be addressed by indexing the expressions using functional indexes, or materializing those expressions during the load of virtual columns.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein is an approach for accelerating access to database data stored in a storage device. A storage device stores data blocks in a base major format in one or more primary storage device. The base major format may be any one of: row-major format, column-major format, and hybrid-columnar format. In response to receiving a request for data from a database server, the storage device rewrites the data blocks stored in the base format in the one or more primary storage devices into a rewritten major format. The rewritten major format is different than the base major format. The rewritten data blocks are stored in a storage device cache, such as flash cache. Rewriting a data block into an alternate format and storing the rewritten data block in the storage device cache is an operation that is referred to herein as rewriting the data block.

The approach may be implemented as a method performed by computing devices, by an apparatus, a system, a device, or in a computer-readable storage medium storing instructions which, when executed by processors, implement the approach.

Database Systems

Since an embodiment of the present invention is implemented within the context of a database management system (DBMS), a description of a database management system is included herein. A database management system manages a database. A database management system may comprise one or more database servers. A database comprises database data and metadata that is stored on a persistent memory mechanism, such as a set of hard disks. Metadata defines database objects, such as relational tables, table columns, views, and triggers.

Database applications and clients interact with a database server by submitting to the database server commands that cause the database server to perform operations on data stored in a database. A database command may be in the form of a database statement that conforms to a database language.

One of the languages for expressing database requests is the Structured Query Language (SQL). There are many different versions of SQL; some versions are standard, others are proprietary. There is also a variety of extensions to SQL. SQL data definition language (DDL) instructions may be issued to a database server to create or configure database objects, such as tables, views, or complex data types. SQL/XML is a common extension of SQL used when manipulating XML data in an object-relational database.

Data Containers

Generally, data is logically arranged within a database in one or more data containers. Each container contains records, and the data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the presented approach are not limited to any particular type of data container or type of database architecture. However, for the purpose of explanation, the examples and the terminology used herein are usually associated with relational or object-relational databases. Thus, the terms "table," "row," and "column" are used herein to refer respectively to the data container, record, and field.

Data containers are typically stored on a hard disk in one or more data blocks. Hence, while instructions or queries issued to a database server refer to data as tables, rows, and columns, that data is actually stored in a database as a collection of data blocks. Through the use of various stored metadata, indexes, and headers, the database server is able to interpret the data within the data blocks as logical tables, rows, and columns.

A data block is an atomic unit of storage space allocated to store raw data for one or more database records (e.g., rows) or portions thereof. Typically, a database system is configured to read and write database records from persistent cache and volatile memory in units no smaller than data blocks. When a record, from a data block, needs to be retrieved, an entire data block containing the record (or pertinent portion of the record) is read into a buffer that the database system uses to temporarily store data blocks. The data block read into the buffer may contain other records or portions thereof.

There are several formats for storing data in a database. Two basic formats include a row-major format and column-major format. In row-major format, column values of a single row are stored contiguously within a data block. In column-major format, values of a column of multiple rows are stored contiguously. In column-major format, a data block may only contain the values for one column. The row-major format and column-major format are collectively referred to herein as major formats.

One of the advantages of column-major format is that it permits better compressibility than row-major format. The values within a column may have common properties, and thus, when the values are stored contiguously, the common properties can be exploited using various compression techniques.

Hybrid-Columnar Format

A hybrid-columnar format is another example of a major format. In hybrid-columnar format, for subsets of rows of a table, a data block may hold the entirety of each subset of rows. However, within the data block, the columns of the subset rows may be stored in column-major format.

There are circumstances in which using hybrid-columnar format is more beneficial than using row-major format or column-major format. One of the advantages of hybrid-columnar format is to provide reasonable performance when retrieving a particular row or when performing table scans. In hybrid-columnar format, retrieving data rows or performing table scans may be performed more efficiently because the hybrid-columnar format allows storing some data in row-major format and other data in column-major format, and using different compression algorithms for different formats. For example, some data blocks may store data for a first column of a table in column-major format, while other data blocks may store data for a set of multiple second columns of the table in row-major format. Hence, a single row of the table may be spread among several data blocks. Therefore, the data blocks that store data for the first column may use different compression algorithm than the algorithm used to compress data in the data blocks that hold data for the second column. The ability to apply different compression algorithms to different data formats may lead to improvements in the process of retrieving data or scanning tables.

Further details related to data blocks may be found in U.S. Published Patent Application No. 2010/0278446, titled "Structure of Hierarchical Compressed Data Structure for Tabular Data." Additional details on various compression formats can be found in U.S. Published Patent Application No. 2010/0281079, titled "Compression Analyzer." Additional details pertaining to different data format storage approaches may be found in "Weaving Relations for Cache Performance," by Anastassia Ailamaki et al, and published in Proceedings of the 27th VLDB Conference, Rome, 2001; and in "A Case for Fractured Mirrors," by Ravishankar Ramamurthy et al, and published in Proceedings of the 28th VLDB Conference, Hong Kong, 2002.

Enhanced Storage Device

An enhanced storage device is a storage device configured to work cooperatively with a database server, and to provide filtered and unfiltered data blocks to the database server. An enhanced storage device may perform some filtering of the data in the data blocks based on filtering criteria provided by the database server. The enhanced storage device may be equipped with modules configured to determine compression formats, evaluate costs associated with sending data to the storage server, and perform selectivity of each predicate.

In managing data storage, an enhanced storage device may utilize metadata stored in each data block, referred to herein as data block metadata. The data block metadata within a data block may, for example, indicate where each column within the data block begins. In addition, the data block metadata may contain control information for database transactions, and a token table used for compressing the data block.

System Architecture

Figure 1:
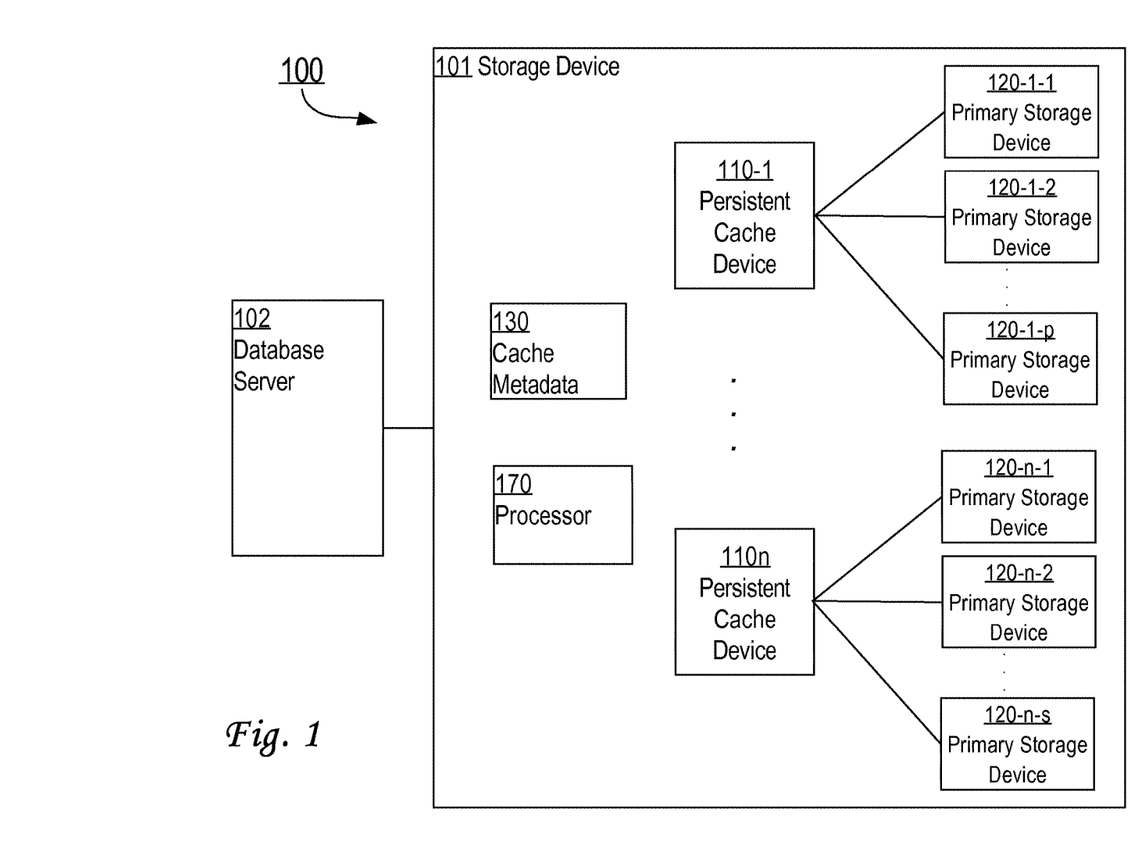
FIG. 1 is a block diagram that depicts an example system for accelerating queries using dynamically generated columnar data in flash cache.

FIG. 1 is a block diagram that depicts an example system 100 for accelerating queries using dynamically generated columnar data in flash cache. An example system 100 comprises a storage device 101 and a database server 102. For the purpose of explanation, FIG. 1 depicts one storage device 101 and one database server 102; however, various embodiments may include any number of storage devices 101 and any number of database servers 102.

Storage device 101 is an enhanced storage device. In an embodiment, a storage device 101 comprises persistent cache devices 110, primary storage devices 120, cache metadata 130 and one or more processors 170. Persistent cache devices 110 may include persistent cache devices 110-1 . . . 110-n, and primary storage devices 120 may include primary storage devices 120-1-1 . . . 120-n-s. Each of persistent cache devices 110 serves as a cache for a particular set of primary storage devices 120. For example, persistent cache device 110-1 serves as a cache for primary storage devices 120-1-1 . . . 120-1-p, while persistent cache device 110-n serves as a cache for primary storage devices 120-n-1 . . . 120-n-s.

In computer technology, memory devices can be volatile or non-volatile. A volatile memory device does not store data after the device is powered off, while a non-volatile memory device continues to store data after the device is powered off. When the non-volatile memory device is powered back on, the data that was previously stored on the device can be read. Examples of non-volatile memory devices include disk drive devices, flash memory devices, and storage servers. The primary purpose of the non-volatile memory devices is to provide shared access to data.

Persistent cache devices 110 and primary storage devices 120 may be implemented as non-volatile memory devices. In an embodiment, a persistent cache device 110 is implemented as a fast-access memory device, while a primary storage device 120 is implemented as a slow-access memory device. Hence, a persistent cache device 110 may be configured to provide access to data faster than a primary storage device 120. However, usually a primary storage device 120 may hold more data than a persistent cache device 110.

Implementations of persistent cache device 110 may vary. For example, persistent cache device 110 may be implemented as a flash memory device, also referred to as flash cache. In the description below, the references to persistent cache device 110 indicate flash cache.

Persistent cache device 110 may be a small, high-speed magnetic disk drive connected to a larger low-speed magnetic disk device such as a primary storage device 120.

Database server 102 may be configured to communicate with storage device 101 and to execute client applications. An example of a database server 102 is a multi-node database server, with each node running an instance of a database server and having shared access to storage device 101. Database server 102 may be configured to request data from storage device 101, receive data from storage device 101, send data to storage device 101, and otherwise communicate with storage device 101.

A storage device 101 is configured to manage receiving, storing and retrieving data. Storage device 101 may receive requests from database server 102. For example, storage device 101 may receive a request from database server 102 to retrieve a particular data block from either primary storage device 120 or persistent cache device 110.

In an embodiment, storage device 101 implements functionalities of an enhanced storage device, described above.

In an embodiment, storage device 101 operates in a "block mode." A block mode is a mode in which storage device 101 provides a client access to read or write data blocks stored in persistent storage 120. Clients retrieve data blocks from storage device 101 in block mode by issuing block requests to storage device 101.

To support reading from and writing to storage device 101 in a block mode, data stored in a primary storage device 120 is organized in data blocks. A data block may have an associated data block address, which uniquely identifies the data block and the data block location within primary storage device 120. A data block stored in primary storage device 120 is referred to herein as a base data block. The major format of a base data block is referred to herein as a base major format.

Storage in persistent cache device 110 may also be organized by data blocks. As copies of various base data blocks are read from primary storage device 120, the copied data blocks may be stored in persistent cache device 110 as cache copy data blocks ("cache copies"). Usually, a data block in a cache copy has the same major format as the base data block of which the cache copy was made.

Storage device 101 may also operate in a mode referred to as a "smart block mode." In the smart block mode, storage device 101 performs one or more operations on the data blocks requested by a storage server client. The operations may transform the content of the data blocks before the data blocks are returned to database server 102.

Storage device 101 may operate in smart block mode in response to a "smart scan request" issued by database server 102. A smart scan request specifies the requested data blocks, the operation to be performed on the requested data blocks, and one or more filtering criteria. For example, database server 102 may issue a "smart scan request" to request data blocks that have only the rows that are filtered according to one or more filtering criteria. In response, storage device 101 retrieves the data blocks from persistent storage 120, filters rows in the data blocks, and returns the data blocks containing only the rows that satisfy the filtering criteria.

Persistent cache devices usually have smaller storage capacity than primary storage devices. Hence, the quantity of cached copies in persistent cache devices 110 is usually smaller than the quantity of data blocks stored in primary storage devices 120. Storage device 101 tracks the data blocks that have been copied from primary storage device 120 to persistent cache device 110, and stores metadata, within cache metadata 130, that reflects the mapping between the primary storage device blocks and the copies of data blocks in persistent cache device 110.

Storage device 101 may be configured to rewrite base data blocks in response to data block smart scan requests. The base data blocks may be rewritten in either block mode or smart block mode. In an embodiment, only the rewritten data blocks are retained in persistent cache 110. Cache copies of the base data blocks from which the rewritten data blocks are generated are not retained in the cache after rewriting. In another embodiment, both the rewritten data blocks and cache of copies of base data blocks are retained in persistent cache.

Storage device 101 may be configured to determine, based on "data block rewrite criteria," a major format to which data blocks may be rewritten. In general, data block rewrite criteria indicate when rewriting a data block to an alternate format may improve efficiency in providing the data requested by database server 102. Taking into account the data block rewrite criteria, storage device 101 may determine an alternate format that facilitates an efficient access to the requested data. For example, metadata describing the table may be passed to the storage device along with the request for data blocks: this metadata may be used by the storage server along with a set of rules that form the block rewrite criteria. Such metadata may describe the database table as narrower than some criterion, or wider than some criterion (i.e., a table having a relatively large number of columns). If it is determined that a database table is wide, then the database blocks having a base format that is row-major format or hybrid-columnar format are rewritten to column-major format.

As another example, the data blocks may reside in containers designated for rewriting. Such rewriting is referred to herein as "container-level" rewriting. When storage device 101 receives a request for data blocks that are stored in the particular container, storage device 101 rewrites the data blocks. A container may be defined as any data structure configured to store the data, and may include, without a limitation, a database table or a database partition. Hence, storage device 101 may be configured to rewrite data blocks that are stored in particular data tables and/or data partitions.

Storage device 101 may be configured to perform a container-level rewriting by issuing Data Definition Language ("DDL") commands to storage device 101 that specify a container for which rewriting is to be performed. Knowing which containers contain data blocks for which rewriting would yield the greatest benefit allows a system administrator to determine the containers for the container-level rewriting.

The differences between the way that the values of a column are stored in base format and in rewritten format are worth noting. When a set of base data blocks from primary storage is rewritten from row-major format to column-major format, values of a column that were stored in separate data blocks in the set may be stored as a contiguous run in persistent cache 110. Similarly, when a set of base data blocks from primary storage is rewritten from hybrid-columnar format to column-major format and stored in persistent cache 110, values of a column that were stored in separate data blocks in the set may be stored as a contiguous run in persistent cache 110. Further, when a set of base data blocks from primary storage is rewritten from column-major format to row-major format and stored in persistent cache 110, values of a column that were stored in separate column vectors in the set may be stored as blocks of contiguous rows in persistent cache 110. Moreover, when a set of base data blocks from primary storage is rewritten from hybrid-columnar format to row-major format and stored in persistent cache 110, values of a row that were stored in separate columns in a compression unit in the set may be stored as blocks of contiguous rows in persistent cache 110.

Once data blocks are rewritten and stored in persistent cache 120, storage device 101 may receive a smart scan request for the data blocks. Depending on the nature of the request, it may or may not be beneficial to satisfy the smart scan request using the cached rewritten data blocks. When a subsequent request is received, storage device 101 bases the decision as to whether to use available rewritten data blocks on "user-rewrite criteria." In general, user-rewrite criteria indicate when use of rewritten data blocks that have a particular format is beneficial for handling a smart block request.

Figure 2:
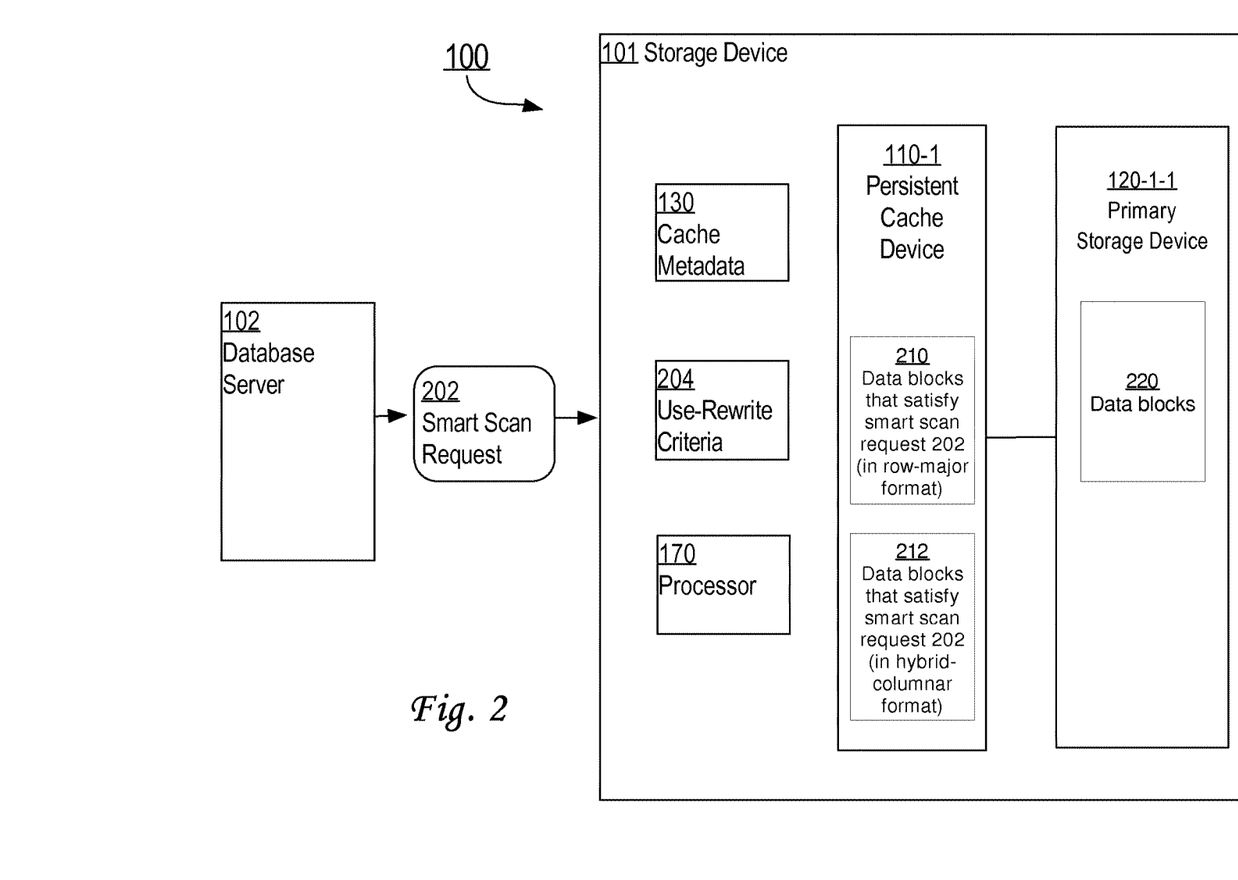
FIG. 2 is a block diagram that depicts an example system for storing various rewritten data blocks.

FIG. 2 is a block diagram that depicts an example system for storing various rewritten data blocks. In FIG. 2, database server 102 sends a smart scan request 202 to storage device 101. In the example depicted in FIG. 2, the received smart scan request 202 is for only a few rows that satisfy filtering criteria. User-rewrite criteria 204 may be used to determine that, if a smart scan request is for a relatively small number of rows, then the data block formats that enable efficient access to the requested data blocks are row-major format and hybrid-columnar format. If rewritten data blocks in such data block formats are already stored in persistent cache device 110-1, then the rewritten data blocks in either of the two formats may be used. However, if the rewritten data blocks stored in persistent cache device 110-1 are rewritten into column-major format, then the available rewritten data blocks are not used to satisfy smart scan request 202. Hence, if rewritten data blocks in row-major format (210) are stored in persistent cache device 110-1, then storage device 101 may use the rewritten data blocks 210. Also, if rewritten data blocks in hybrid-columnar format (212) are stored in persistent cache device 110-1, then storage device 101 may use the rewritten data blocks 212. However, if neither rewritten data blocks in row-major format (210) nor rewritten data blocks in hybrid-columnar format (212) are stored in persistent cache device 110-1, then storage device may use data blocks 220 stored in primary storage device 120-1-1.

According to another example, a smart scan request may contain metadata describing the number of data blocks that are being scanned, and such metadata may also describe how many columns the table has and how many columns are needed for the result. Such metadata may be used to determine that this request is eligible for rewrite or eligible to use an existing rewrite. User-rewrite criteria 204 for using rewritten data blocks rewritten to column-major format to satisfy a smart scan request may require that a smart scan request entail scanning many rows and returning a subset of the columns.

Tracking Data Block Rewrites

To track whether a particular data block (or other data structure) is present in rewritten form in persistent cache device 110, storage device 101 uses cache metadata 130 to identify the data blocks that have been rewritten. For data blocks that have been rewritten, "rewritten block metadata" is used to record detailed information about the rewritten data blocks. Rewritten block metadata may be stored as part of cache metadata 130.

Rewritten block metadata may comprise information that identifies data blocks that have been rewritten, the area of persistent cache 110 where the rewritten data blocks are stored, and the formats in which the respective rewritten data blocks are stored. According to an embodiment, the rewritten block metadata may indicate that the requested data is stored not only in one or more rewritten data formats, but also in base major format, which may be the same base format in which the data is stored in primary storage device 120.

According to an embodiment, rewritten block metadata contains information about the structure of the rewritten data blocks. For example, for data blocks rewritten to column-major format, rewritten block metadata may specify where each of the columns is stored in persistent cache 110, and/or for each rewritten data block, where the column values for that data block are stored in persistent cache 110. In addition, the rewritten block metadata may contain data block metadata, which is a copy of data block metadata that existed in the data blocks before the data blocks were rewritten.

Rewritten block metadata may be used to reconstruct "filtered" data blocks from the rewritten data blocks. For example, storage device 101 may store rewritten data blocks rewritten to hybrid-columnar format (212 in FIG. 2). Then, storage device 101 may receive a smart scan request 202 for the data blocks from database server 101. The smart scan request 202 may specify a predicate condition on a column on which to filter rows in the requested data blocks. The rewritten data blocks 212 are scanned and filtered based on the column and the predicate condition, thereby identifying the subset of rows in the rewritten data blocks that satisfy the criteria ("filtered rows").

The returned filtered data blocks contain only filtered rows. According to an embodiment, filtered data blocks must contain pertinent portions of the data block metadata in the original unfiltered data blocks, information such as transactional control information. To generate the filtered data blocks, storage device 101 may use the rewritten block metadata. The rewritten block metadata is used to locate the columns to be returned for the filtered data blocks, and is also used to generate data block metadata to include in the returned filtered data blocks.

Accelerating Smart Scan Requests

Figure 3A:
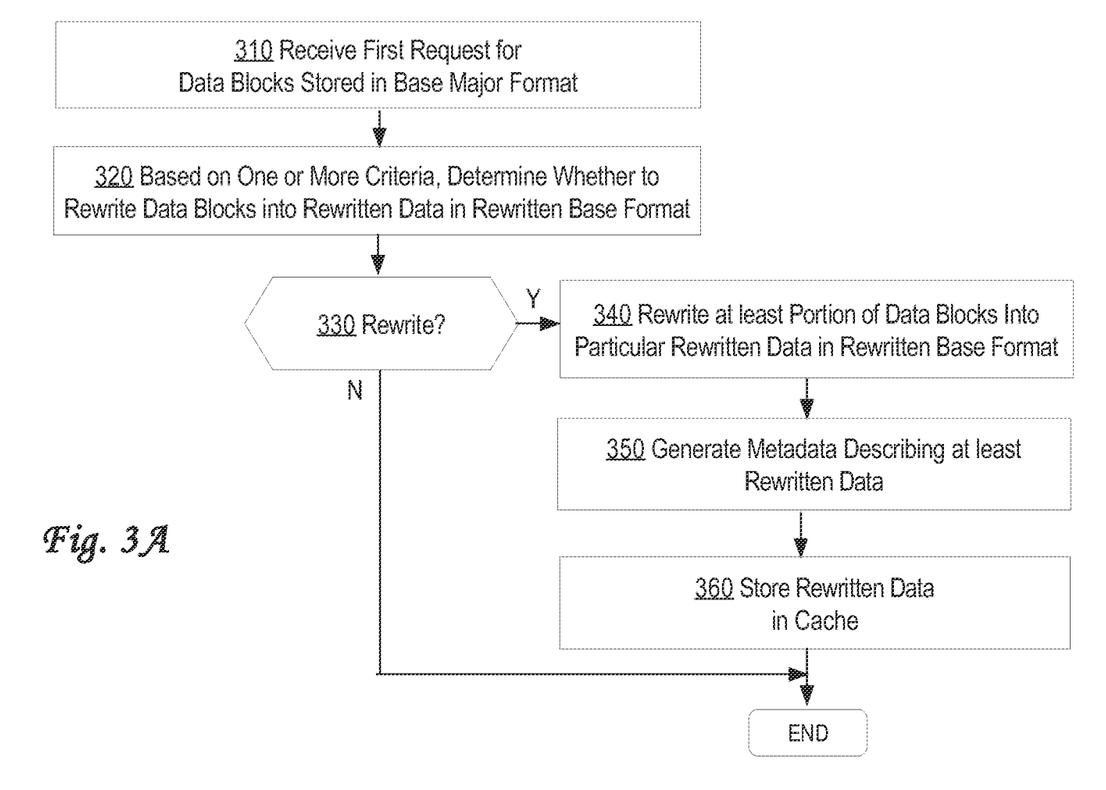
FIG. 3A is a flow chart that depicts an example process of accelerating smart scan requests using rewritten data blocks.
Figure 3B:
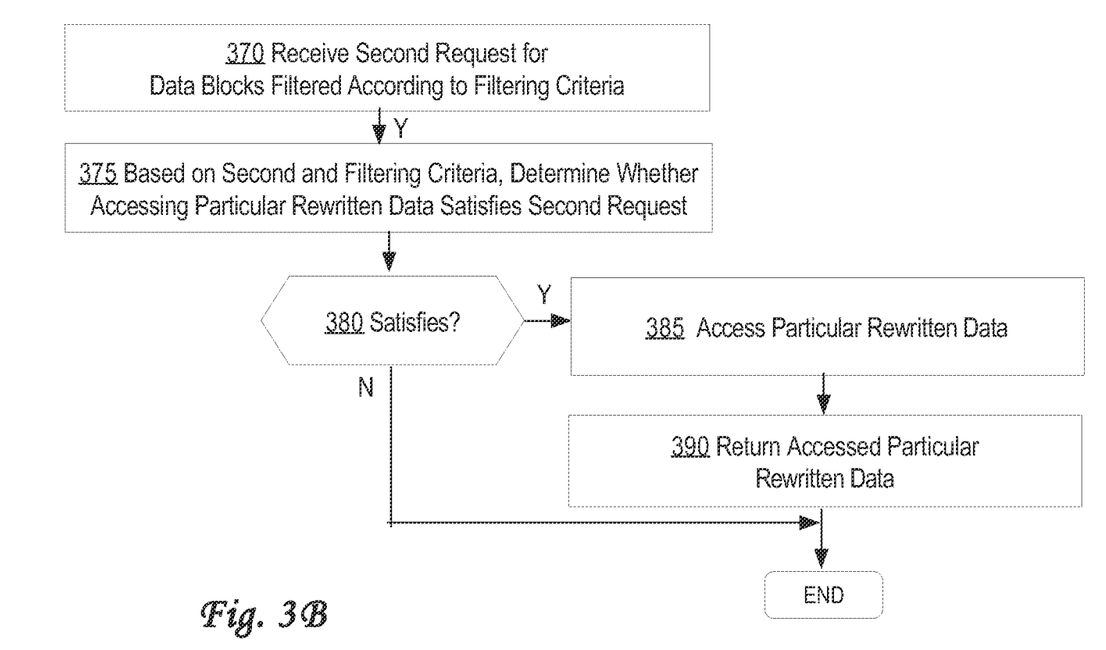
FIG. 3B is a flow chart that depicts an example process of using rewritten data blocks.

FIG. 3A is a flow chart that depicts an example process of accelerating smart scan requests using rewritten data blocks, and FIG. 3B is a flow chart that depicts an example process of using the rewritten data blocks.

Referring first to FIG. 3A, in step 310, storage device 101 receives a first request for data blocks stored in storage device 101. In an embodiment, the first request may be a smart scan request. The requested data blocks may be stored in any of primary storage devices. The data blocks may be stored in any of major formats, such as row-major format, column-major format, and hybrid-columnar format. In some embodiments, the requested data blocks may be stored in various formats in any of primary storage devices and in any of persistent cache devices.

In an embodiment, requested data blocks may be already stored in a persistent cache device, either in a base major format, a rewritten major format, or both. For example, if the requested data happened to be requested quite frequently, then the requested data may have been already retrieved from a primary storage device, rewritten in rewritten format into rewritten data, and stored in the persistent cache device in the rewritten format. The rewritten format may be any one of the major formats, such as row-major format, column-major format, or hybrid-columnar format, or any other data block format.

However, in some situations, no copy of the requested data has been already created and stored in a persistent cache device. In such a case, the requested data may be available in a primary storage device.

In step 320, it is determined whether to rewrite data blocks into rewritten data in rewritten base format. For example, if the requested data blocks are only accessible at a primary storage device, than there may be a reason to retrieve the requested data blocks, rewrite them in rewritten format into rewritten data and store the rewritten data in a persistent cache device. According to another example, if the rewritten data for the requested data blocks has been already created and stored in the persistent cache device, then it may be beneficial to rewrite the requested blocks in another rewritten format into other rewritten data and store the other rewritten data in the persistent cache device.

The determination whether to rewrite the requested data blocks may be based on one or more criteria, such as data block rewrite criteria, described above. For example, such criteria may include a combination of rules encoded into the embodiment and dynamic metadata associated with a requested data blocks. Such criteria may therefore include both static rules and cost based decisions depending on what is optimal for that particular storage server, the number of requests for data blocks it receives, and the availability of non-volatile storage to store the rewritten data.

In an embodiment, one or more data block rewrite criteria may be used to determine rewrite format that allows efficient access to the requested data blocks. For example, using the data block rewrite criteria, such as the type of queries that have been issued to the requested data in the past, similar queries issued recently to the system, the characteristics of the past queries and the characteristics of the tables in which the requested data blocks are stored, the system may determine the rewrite format that allows the efficient access to the requested data blocks. Based on the data block rewrite criteria, the system may determine whether row-major format, column-major format, hybrid-columnar format or any other available data format may provide efficient access to the requested data blocks in terms of CPU resources, I/O performance and other characteristics.

The one or more criteria may also be used to determine whether all or at least a portion of the data blocks may be rewritten into rewritten data format. For example, it may be determined that accessing a portion of the requested data blocks represented in hybrid-columnar format may provide more efficient access to the requested data blocks than accessing the requested data blocks in row-major format.

If in step 330 it is determined that at least a portion of the data blocks that satisfy the first request need to be rewritten, then the rewriting starts in step 340. Otherwise, the data blocks are not rewritten. For example, if, based on the previously received and processed queries, it has been determined that access to the data blocks stored in storage and represented in row-major format is relatively efficient, then the data blocks are not rewritten. However, in an embodiment, if such data blocks are requested frequently, some metadata may be created for the data blocks (similarly as in step 350, described below), and the data blocks may be at least copied to a persistent cache device (similarly as in step 360, described below) to speed up access to the requested data blocks, or if needed, rewritten to column-major format. According to another example, if, based on the previously received and processed queries, it has been determined that access to the data blocks stored in storage and represented in column-major format is relatively efficient, then the data blocks are not rewritten. However, in an embodiment, if such data blocks are requested frequently, some metadata may be created for the data blocks, and the data blocks may be at least copied to a persistent cache device to speed up access to the requested data blocks, or if needed, rewritten to row-major format. According to another example, if, based on the previously received and processed queries, it has been determined that access to the data blocks stored in storage and represented in hybrid-columnar format is relatively inefficient, then some metadata may be created for the data blocks, and the data blocks may be rewritten to column-major format, row-major format, or both columnar and row major formats.

In step 340, at least a portion of the data blocks is rewritten into particular rewritten data in rewritten major format. For example, for the data blocks that are stored in a primary storage device (or in a persistent cache device) in row-major format, the system may determine that having at least a portion of the data blocks rewritten in hybrid-columnar format and stored in the persistent cache device would provide more efficient access to the data blocks in terms of balancing a CPU load and an I/O load. If such a determination is made, then in step 340, at least the portion of the data blocks may be rewritten in the hybrid-columnar format.

In step 350, metadata for the rewritten data is generated. Metadata for the rewritten data may describe or otherwise identify the rewritten data and the particular rewritten data. Further, the metadata may indicate a location of the particular rewritten data in the storage device. For example, when the rewritten data is to be stored in a persistent cache device, then the metadata may describe the rewritten data and the location in the persistent cache device, on which the rewritten data is stored.

In step 360, the rewritten data is stored in a persistent cache device. Information identifying the rewritten data and indicating a location at which the rewritten data is stored in the persistent cache device may be stored in metadata, as described above. Once stored in the persistent cache device, the rewritten data (including the particular rewritten data) becomes easily accessible to a query processing module. Hence, if a query, requesting the data block for which the rewritten data was generated, is received in the future, then the rewritten data may be accessed at the persistent cache device. Accessing the rewritten data from the persistent cache device may be more efficient and resource-effective than accessing the corresponding data blocks from a primary storage device.

FIG. 3B is a flow chart that depicts an example process of using rewritten data blocks. In step 370, storage device 101 receives a second request for data blocks that are stored in storage device 101 and that are filtered according to filtering criteria. In an embodiment, the second request is a smart scan request.

In an embodiment, one or more filtering criteria may be determined based on the predicates included in the second request. For example, if the second request is a query requesting certain data blocks from a particular table, then the predicates identifying the particular table and the certain data blocks may constitute one or more filtering criteria. In an embodiment, data may be stored in rewritten form filtered by column where only frequently accessed columns are cached. In this embodiment, the columns needed to satisfy the request should be a proper subset of the cached columns. In another embodiment, only the data satisfying a frequently used predicate may have been cached. In this embodiment, the predicates in the request must be compared with the predicate information in the metadata and the rewritten data may be used if the predicate matches.

In an embodiment, the requested data blocks may be located in any of primary storage devices and/or in any of persistent cache devices. The data blocks stored in the primary storage devices and/or the persistent cache devices may be stored in any of major formats, such as row-major format, column-major format, and hybrid-columnar format. However, if the data blocks are stored in any of the persistent cache devices, then the data blocks might have been rewritten to rewritten data and stored as the rewritten data in the persistent cache device, as described in FIG. 3A. For example, if the requested data blocks happened to be requested quite frequently, then the requested data blocks might have been already retrieved from a primary storage device, rewritten in the rewritten base format to the rewritten data, and stored in the persistent cache device. The rewritten base format may be determined based on data block rewrite criteria, and may include any of row-major format, column-major format, or hybrid-columnar format, or any other data block format.

However, in some situations, no copy of the requested data blocks has been already created and stored in a persistent cache device. In such a case, the requested data blocks may be available in a primary storage device.

In step 375, it is determined whether, based on one or more second criteria and one or more filtering criteria, accessing particular rewritten data, stored in a persistent cache device, satisfies the second request. In an embodiment, the second criteria correspond to user-rewrite criteria, described above. This correspondence may be established by comparing the metadata sent by the server as part of the request with the metadata that is stored in the cache and that describes the cache contents. Such metadata may include the range of data blocks cached, the columns that have been cached, and the indication of all the rows that are present of some subset of rows. Such a subset of rows may be described by a predicate, or it may be described by a bit-vector indicating which rows in the cache are valid.

In an embodiment, second rewrite criteria may be determined based on the type of queries that have been issued to the requested data in the past. The system may also take into consideration similar queries or other information related to the queries received in the past. In an embodiment, similarity of queries may be tracked by recording, on a server, statistical information pertaining to frequently evaluated queries, frequently accessed ranges of data blocks, or frequently accessed columns. In another embodiment, such statistics may be created and maintained on the storage device.

If, in step 380, it is determined that, based on one or more second criteria and one or more filtering criteria, accessing particular rewritten data, stored in a persistent cache device, satisfies the second request, then, in step 385, the particular rewritten data is accessed in the persistent cache device. Otherwise, the data blocks that satisfy the second request may be accessed from one or more primary storage devices; however, accessing the requested data blocks may be less efficient than accessing the requested data blocks as rewritten data from the persistent cache device.

In step 385, particular rewritten data is accessed from a persistent cache device. In an embodiment, metadata of the rewritten data may be used to identify the particular rewritten data and a location of the particular rewritten data in the persistent cache device. According to an embodiment, rewritten block metadata contains information about the structure of the rewritten data blocks. For example, for data blocks rewritten to column-major format, rewritten block metadata may specify where each of the columns is stored in the persistent cache device, and/or for each rewritten data block, where the column values for that data block are stored in the persistent cache device. In addition, rewritten block metadata may contain data block metadata, which is a copy of data block metadata that existed in the data blocks before the data blocks were rewritten.

Further, the rewritten block metadata may indicate that the rewritten data blocks are stored not only in one or more rewritten data formats, but also in a base major format, which is the same base format in which the data is stored in a primary storage device.

In step 390, the accessed particular rewritten data is returned to a query processing module. For example, if the second request was a query requesting certain data blocks from a particular table, and the certain data blocks from the particular table have been rewritten to the particular rewritten data and stored in the persistent cache device, then the particular rewritten data may be returned to the query processing module.

DDL for Container Level

The present approach may be implemented in a variety of mechanisms. Described below is an implementation that may be applicable in a DBMS, and that is based on implementing additional DDL storage clauses. The DDL clauses may be issued to a storage device directly or to a DBMS of the storage device to activate data block rewriting from a base format to column-major format for a database object, such as a table or partition.

In an embodiment, enabling of data block rewriting is accomplished through configuration parameters specified in a startup configuration file used by a DBMS upon start up. The first parameter may be to enable or disable aspects of data block rewriting, and may be represented by "_enable_columnar_caching". The other parameter may be used to control the maximum expansion of decompressed data to avoid run-away cases, and may be represented by "_max_columnar_ratio".

Creating a table DDL storage clause may be accomplished by providing additional sub-options to the KEEP syntax. While the KEEP syntax provides:
  Create Table<T><table specification>Storage (Cell_flash_cache Keep), the additional sub-options of KEEP may be represented as:
  Create Table<T><table specification>Storage (Cell_flash_cache Keep [BLOCK|COLUMNAR|BOTH]), and
  Create Table<T><table specification>Partition <P>Storage (Cell_flash_cache Keep [BLOCK|COLUMNAR|BOTH]), wherein "BLOCK" is a default setting.

The default sub-option is BLOCK.

To request only retaining in cache the data rewritten into column-major format, a sub-option "COLUMNAR" may be used. To request both base major format and rewritten format be cached, a sub-option "BOTH" may be used.

According to one implementation, the alter table DDL storage clause is extended to provide an alternative to the KEEP syntax. The grammar provides for:
  Alter Table<T>Storage (Cell_flash_cache Keep), the new sub-options of KEEP for which the default is BLOCK will provide for:
  Alter Table<T>Storage (Cell_flash_cache Keep [BLOCK|COLUMNAR|BOTH])
  Alter Table<T>Modify Partition<P>Storage (Cell_flash_cache Keep [BLOCK|COLUMNAR|BOTH]).

One of the parameters may be needed to limit the maximum expansion ratio of any one column before that column is cached still compressed. For example, "_max_columnar_ratio" parameter may be used.

It is possible that some columns could have a very high expansion factor. For example, a column for storing state names written out in full with a dictionary compression may have a high expansion factor. In order to prevent excessive flash usage for data that should decompress with relatively little cost (relatively to the data volume), the size of the columns may be initially limited to 24× compression ratio. If the compression ratio is exceeded, then the cached column may be compressed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
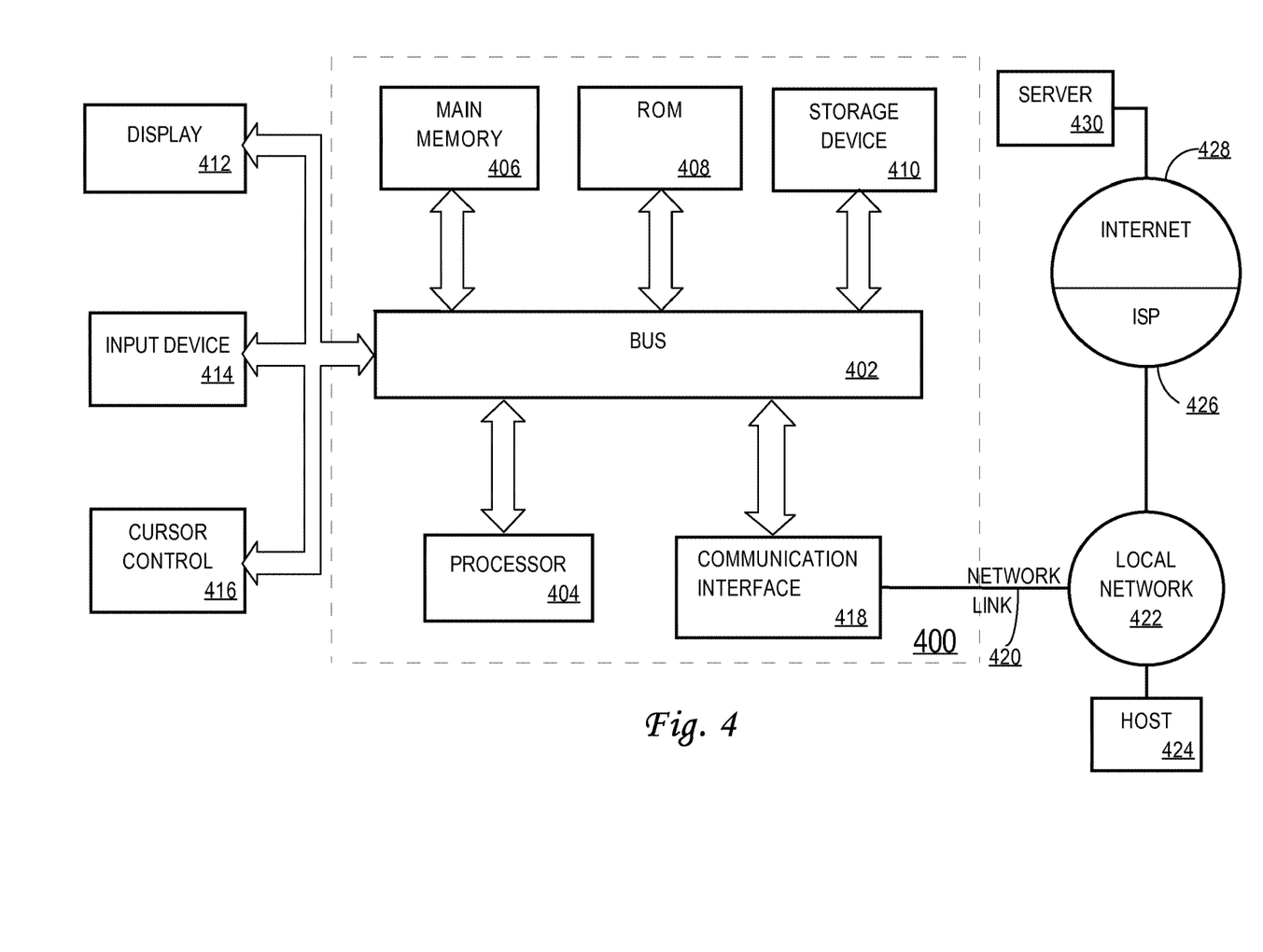
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising steps of:
   a storage device, which cooperates with a database server, but which is separate from the database server, receiving a first request for data stored in said storage device, said storage device storing said data in a base major format in one or more primary storage devices, said storage device comprising a cache;
   wherein said base major format is any one of: a row-major format, a column-major format and a hybrid-columnar format;
   in response to receiving the first request for said data stored in said storage device:
      said storage device determining, based on first one or more criteria, to rewrite said data into rewritten data in a rewritten major format;
      in response to determining to rewrite said data into rewritten data in a rewritten major format:
         said storage device rewriting at least a portion of said data in a particular major format, of said base major format, into particular rewritten data in said rewritten major format;
         wherein said rewritten major format is different than said particular major format;
         said storage device storing said particular rewritten data in said cache; and
         said storage device returning at least a portion of the data requested by said first request to said database server;
         said storage device receiving a second request for said data stored in said storage device;
            in response to receiving said second request, said storage device determining to access said particular rewritten data to satisfy said second request; and
            in response to determining to access said particular rewritten data to satisfy said second request, said storage device accessing said particular rewritten data stored in said cache.

2. The method of claim 1, wherein determining to access said particular rewritten data to satisfy said second request is performed based on second one or more criteria.

said second request, said storage device accessing said particular rewritten data.

3. A method comprising steps of:

a storage device, which cooperates with a database server, but which is separate from the database server, receiving a first request for data blocks stored in said storage device, said storage device storing rows in said data blocks in a base major format in one or more primary storage devices, said storage device comprising a cache;

wherein said base major format is any one of: a row-major format, a column-major format and a hybrid-columnar format;

in response to receiving the first request for said data blocks stored in said storage device:

said storage device determining, based on first one or more criteria, to rewrite said data blocks into rewritten data in a rewritten major format;

in response to determining to rewrite said data blocks into rewritten data in a rewritten major format:

said storage device rewriting at least a portion of said data blocks in a particular major format, of said base major format, into particular rewritten data in said rewritten major format;

wherein said rewritten major format is different than said particular major format;

said storage device generating metadata describing at least said rewritten data;

said storage device storing said particular rewritten data in said cache; and said storage device returning at least a portion of the data blocks requested by said first request to said database server;

said storage device receiving a second request for said data stored in said storage device;

in response to receiving said second request, said storage device determining to access said particular rewritten data to satisfy said second request; and in response to determining to access said particular rewritten data to satisfy said second request, said storage device accessing said particular rewritten data stored in said cache.

4. The method of claim 3, wherein determining, to access said particular rewritten data to satisfy said second request is performed based on second one or more criteria.

5. The method of claim 3, wherein the first one or more criteria are based on at least one of:

a number of columns in a database table; and a database container that contains at least said portion of said data blocks requested by said first request.

6. The method of claim 4, wherein the second one or more criteria is based on at least one of:

a number of columns requested in said second request; and a number of rows accessed to service said second request.

7. The method of claim 3, wherein said at least said portion of said data blocks includes columns, where said metadata specifies a location of each column within said cache.

8. An apparatus comprising:

one or more processors;

a storage device, which cooperates with a database server, but which is separate from the database server, configured to perform:

receiving a first request for data stored in said storage device, said storage device storing said data in a base major format in one or more primary storage devices, said storage device comprising a cache;

wherein said base major format is any one of: a row-major format, a column-major format and a hybrid-columnar format;

in response to receiving the first request for said data stored in said storage device:

said storage device determining, based on first one or more criteria, to rewrite said data into rewritten data in a rewritten major format;

in response to determining to rewrite said data into rewritten data in a rewritten major format:

said storage device rewriting at least a portion of said data in a particular major format, of said base major format, into particular rewritten data in said rewritten major format;

wherein said rewritten major format is different than said particular major format;

said storage device storing said particular rewritten data in said cache; and said storage device returning at least a portion of the data requested by said first request to said database server;

said storage device receiving a second request for said data stored in said storage device;

in response to receiving said second request, said storage device determining to access said particular rewritten data to satisfy said second request; and in response to determining to access said particular rewritten data to satisfy said second request, said storage device accessing said particular rewritten data stored in said cache.

9. The apparatus of claim 8, wherein determining, to access said particular rewritten data to satisfy said second request is performed based on second one or more criteria.

10. An apparatus comprising:

one or more processors;

a storage device, which cooperates with a database server, but which is separate from the database server, configured to perform:

receiving a first request for data blocks stored in said storage device, said storage device storing rows in said data blocks in a base major format in one or more primary storage devices, said storage device comprising a cache;

wherein said base major format is any one of: a row-major format, a column-major format and a hybrid-columnar format;

in response to receiving the first request for said data blocks stored in said storage device:

based on first one or more criteria, determining to rewrite said data blocks into rewritten data in a rewritten major format;

in response to determining to rewrite said data blocks into rewritten data in a rewritten major format:

said storage device rewriting at least a portion of said data blocks in a particular major format, of said base major format, into particular rewritten data in said rewritten major format;

wherein said rewritten major format is different than said particular major format;
said storage device generating metadata describing at least said rewritten data;
storing said particular rewritten data in said cache; and
returning at least a portion of the data blocks requested by said first request to said database server;
receiving a second request for said data stored in said storage device;
in response to receiving said second request, determining to access said particular rewritten data to satisfy said second request; and
in response to determining to access said particular rewritten data to satisfy said second request, said storage device accessing said particular rewritten data stored in said cache.

11. The apparatus of claim 10, wherein determining to access said particular rewritten data to satisfy said second request is performed based on second one or more criteria.

12. The apparatus of claim 10, wherein the first one or more criteria is based on at least one of:
a number of columns in a database table; and
a database container that contains at least said portion of said data blocks requested by said first request.

13. The apparatus of claim 10, wherein said at least said portion of said data blocks includes columns, where said metadata specifies a location of each column within said cache.

14. The apparatus of claim 11, wherein the second one or more criteria is based on at least one of:
a number of columns requested in said second request; and
a number of rows accessed to service said second request.

15. A non-transitory computer-readable storage medium storing one or more instructions which, when executed by one or more processors, cause:
a storage device, which cooperates with a database server, but which is separate from the database server, receiving a first request for data stored in said storage device, said storage device storing said data in a base major format in one or more primary storage devices, said storage device comprising a cache;
wherein said base major format is any one of: a row-major format, a column-major format and a hybrid-columnar format;
in response to receiving the first request for said data stored in said storage device:
said storage device determining, based on first one or more criteria, to rewrite said data into rewritten data in a rewritten major format;
in response to determining to rewrite said data into rewritten data in a rewritten major format:
said storage device rewriting at least a portion of said data in a particular major format, of said base major format, into particular rewritten data in said rewritten major format;
wherein said rewritten major format is different than said particular major format;
said storage device storing said particular rewritten data in said cache; and
said storage device returning at least a portion of the data requested by said first request to said database server;
said storage device receiving a second request for said data stored in said storage device;
in response to receiving said second request, said storage device determining to access said particular rewritten data to satisfy said second request; and
in response to determining to access said particular rewritten data to satisfy said second request, said storage device accessing said particular rewritten data stored in said cache.

16. The non-transitory computer-readable storage medium of claim 15, wherein determining to access said particular rewritten data to satisfy said second request is performed based on second one or more criteria.

17. A non-transitory computer-readable storage medium storing one or more instructions which, when executed by one or more processors, cause:
a storage device, which cooperates with a database server, but which is separate from the database server, receiving a first request for data blocks stored in said storage device, said storage device storing rows in said data blocks in a base major format in one or more primary storage devices, said storage device comprising a cache;
wherein said base major format is any one of: a row-major format, a column-major format and a hybrid-columnar format;
in response to receiving the first request for said data blocks stored in said storage device:
said storage device determining, based on first one or more criteria, to rewrite said data blocks into rewritten data in a rewritten major format;
in response to determining to rewrite said data blocks into rewritten data in a rewritten major format:
said storage device rewriting at least a portion of said data blocks in a particular major format, of said base major format, into particular rewritten data in said rewritten major format;
wherein said rewritten major format is different than said particular major format;
said storage device generating metadata describing at least said rewritten data;
said storage device storing said particular rewritten data in said cache; and
said storage device returning at least a portion of the data blocks requested by said first request to said database server;
said storage device receiving a second request for said data stored in said storage device;
in response to receiving said second request, said storage device determining to access said particular rewritten data to satisfy said second request; and
in response to determining to access said particular rewritten data to satisfy said second request, said storage device accessing said particular rewritten data stored in said cache.

18. The non-transitory computer-readable storage medium of claim 17, wherein determining to access said particular rewritten data to satisfy said second request is performed based on second one or more criteria.

19. The non-transitory computer-readable storage medium of claim 17, wherein the first one or more criteria is based on at least one of:
a number of columns in a database table; and
a database container that contains at least said portion of said data blocks requested by said first request.

20. The non-transitory computer-readable storage medium of claim 18, wherein the second one or more criteria is based on at least one of:
a number of columns requested in said second request; and
a number of rows accessed to service said second request.

21. The non-transitory computer-readable storage medium of claim 17, wherein said at least said portion of said data blocks includes columns, where said metadata specifies a location of each column within said cache.

22. The method of claim 1, wherein determining, to access said particular rewritten data to satisfy said second request is performed based on second one or more criteria.

23. The method of claim 1, wherein the first one or more criteria are based on at least one of:
a number of columns in a database table; and
a database container that contains at least said portion of data blocks requested by said first request.

24. The method of claim 22, wherein the second one or more criteria is based on at least one of:
a number of columns requested in said second request; and
a number of rows accessed to service said second request.

25. The non-transitory computer-readable storage medium of claim 17, wherein determining, to access said particular rewritten data to satisfy said second request is performed based on second one or more criteria.

26. The non-transitory computer-readable storage medium of claim 17, wherein the first one or more criteria are based on at least one of:
a number of columns in a database table; and
a database container that contains at least said portion of data blocks requested by said first request.

27. The non-transitory computer-readable storage medium of claim 25, wherein the
second one or more criteria is based on at least one of:
a number of columns requested in said second request; and
a number of rows accessed to service said second request.

* * * * *

UNITED STATES PATENT AND TRADEMARK OFFICE
CERTIFICATE OF CORRECTION

PATENT NO. : 10,296,462 B2
APPLICATION NO. : 13/840811
DATED : May 21, 2019
INVENTOR(S) : Loaiza et al.

Page 1 of 1

It is certified that error appears in the above-identified patent and that said Letters Patent is hereby corrected as shown below:

On the Title Page

Item (72) Inventors, Line 1, delete "Woodwide" and insert -- Woodside --, therefor.

In the Claims

In Column 17, Lines 4-5, in Claim 2, below "criteria." delete "said second request, said storage device accessing said particular rewritten data.".

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*